United States Patent
Takahashi et al.

(10) Patent No.: US 8,075,825 B2
(45) Date of Patent: Dec. 13, 2011

(54) SPLIT STATOR SEGMENT MANUFACTURING METHOD

(75) Inventors: Hideaki Takahashi, Nagoya (JP); Takaaki Kiyono, Okazaki (JP); Koji Nakanishi, Konan (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 28 days.

(21) Appl. No.: 12/668,531

(22) PCT Filed: Jul. 7, 2008

(86) PCT No.: PCT/JP2008/062648
§ 371 (c)(1),
(2), (4) Date: Jan. 11, 2010

(87) PCT Pub. No.: WO2009/025134
PCT Pub. Date: Feb. 26, 2009

(65) Prior Publication Data
US 2010/0187918 A1    Jul. 29, 2010

(30) Foreign Application Priority Data

Aug. 21, 2007 (JP) ................................ 2007-214467
Oct. 24, 2007 (JP) ................................ 2007-276068

(51) Int. Cl.
*B29C 39/10* (2006.01)
(52) U.S. Cl. ................ 264/255; 264/272.2; 264/272.19; 264/275
(58) Field of Classification Search ........................ None
See application file for complete search history.

(56) References Cited

U.S. PATENT DOCUMENTS

| | | | | |
|---|---|---|---|---|
| 1,796,421 A * | 3/1931 | Apple | ............................... | 336/96 |
| 2,711,492 A * | 6/1955 | Ballman | ................. | 310/216.132 |
| 2,719,239 A * | 9/1955 | Wanting | ........................ | 310/431 |
| 3,201,729 A * | 8/1965 | Blanchi et al. | ................... | 336/83 |
| 3,348,183 A * | 10/1967 | Hodges et al. | ................. | 336/223 |
| 3,813,763 A | 6/1974 | Church | | |
| 4,182,026 A | 1/1980 | Searle | | |
| 4,573,258 A * | 3/1986 | Io et al. | ........................... | 29/596 |
| 5,948,338 A * | 9/1999 | George, Jr. | ................. | 264/272.15 |
| 6,036,908 A * | 3/2000 | Nishida et al. | ................. | 264/254 |
| 6,075,304 A * | 6/2000 | Nakatsuka | ............. | 310/216.137 |
| 7,370,402 B2 * | 5/2008 | Munk et al. | ...................... | 29/596 |
| 2007/0114878 A1 | 5/2007 | Tatebe | | |
| 2009/0179506 A1 * | 7/2009 | Saga et al. | ....................... | 310/45 |
| 2009/0302694 A1 * | 12/2009 | Asai | ............................... | 310/45 |

FOREIGN PATENT DOCUMENTS

| | | | |
|---|---|---|---|
| DE | 197 03 497 A1 | | 8/1997 |
| DE | 10 2004 029442 A1 | | 1/2006 |
| JP | 57139914 | * | 8/1982 |
| JP | 58133150 | * | 8/1983 |
| JP | 62-196053 | | 8/1987 |
| JP | 6-311675 | | 11/1994 |
| JP | 2004-229429 A | | 8/2004 |
| JP | 2004-248429 A | | 9/2004 |
| JP | 2007-143324 A | | 6/2007 |

* cited by examiner

*Primary Examiner* — Edmund H. Lee
(74) *Attorney, Agent, or Firm* — Kenyon & Kenyon LLP

(57) ABSTRACT

A split stator is arranged such that a formed edgewise coil is mounted on a teeth of a split stator core through an insulator, and a resin molded portion is formed excepting long ends of the edgewise coil.

4 Claims, 12 Drawing Sheets

SPLIT STATOR SEGMENT MANUFACTURING METHOD

This is a 371 national phase application of PCT/JP2008/062648 filed 7 Jul. 2008, claiming priority to Japanese Patent Applications No. 2007-214467 filed 21 Aug. 2007, and No. 2007-276068 filed 24 Oct. 2007, respectively, the contents of which are incorporated herein by reference.

TECHNICAL FIELD

The present invention relates to an easily manufacturable split stator for motor and a method of manufacturing the split stator.

BACKGROUND ART

Heretofore, there is a method of manufacturing a stator core by laminating steel sheets produced by press-punching to form a stator core and then injection-molding resin on the core with a coil being wounded thereon.

On the other hand, there is also another method of manufacturing a stator core by assembling a plurality of split cores on each of which a coil is mounted. In this case of using the split cores, they are assembled integrally by use of a shrink fitting ring.

Further, a method of manufacturing a split stator by molding each split core with resin is disclosed in JP2007-143324A. Specifically, this method is achieved by winding a coil around a single tooth of a split core, inwardly compressing the wound coil toward a central axis of the teeth by use of a press die and simultaneously injecting resin into the press die also used as an injection molding die to mold each core integral with the coil.

This technique could increase a space factor of the coil. Further, only the periphery of each coil has only to be coated with resin by molding, with the result that an amount of resin necessary for molding can be reduced.

DISCLOSURE OF INVENTION

Problems to be Solved by the Invention

However, the technique of JP2007-143324A would cause the following problems.

(1) While being compressed by the press die, the coil is held in contact with the press die with no clearance between the press die and the coil. Accordingly, resin is not allowed to enter between the contact portions of the press die and the coil. After the molding, the coil is thus directly exposed. This exposed state would cause some problems in terms of insulation. In the case where an insulator is provided on the outer periphery of the coil for ensuring insulation, a cost increase problem is caused.

(2) In a motor for driving a hybrid electric vehicle, on the other hand, the resin molding is adopted for achieving heat transmission and heat release from a coil, not for ensuring insulation. Therefore, an exposed coil itself would not cause any problem in terms of insulation.

However, a resin layer around the exposed portion of the coil is very thin, which may come off later and stick to the periphery of a rotor.

In the technique of JP2007-143324A, particularly, the pressing and the resin injection molding are carried out at the same time. In the pressing, however, when the press die is opened, the coil tends to expand outwardly by spring back due to residual stress in the coil, breaking the resin layer and thus causing broken resin pieces to fly off. In this respect, the technique of JP2007-143324A has to be improved for the practical use thereof.

(3) Moreover, to perform the resin molding while uniformly pressing the coil toward the central axis of the teeth from outside by use of the press die, an advanced manufacturing technique combining a pressing technique and an injection molding technique has been required. This results in an expensive manufacturing facility, leading to a manufacturing cost increase.

The present invention has been made in view of the above circumstances and has an object to provide a split stator capable of being manufactured at low manufacturing cost and by a practical manufacturing technique, and a manufacturing method thereof.

Means for Solving the Problems (1) To achieve the above object, one aspect of the present invention provides a split stator comprising: a split core having a teeth; an insulator fitted on the teeth; and a formed coil mounted on the teeth through the insulator, the coil having a terminal portion; wherein the coil is molded with resin excepting the terminal portion of the coil.

(2) In the above split stator (1), preferably, the insulator is integrally fitted on the split core by resin molding.

(3) According to another aspect, the invention provides a motor including the split stator (1).

(4) According to another aspect, the invention provides a split stator manufacturing method comprising the steps of: forming an insulator on a split core by resin molding using a molding die; inserting a formed coil in the molding die, and molding a winding portion of the coil with resin.

(5) In the split stator manufacturing method (4), preferably, the molding die includes a first upper die for insulator and a second upper die for resin molding, which are selectively used, and a lower die, and the method comprises the steps of: supplying resin around a teeth of the split core before closing the molding die, and then closing and clamping the molding die to form the insulator from the resin; opening the molding die; changing the first upper die to the second upper die; inserting the formed coil in the molding die and supplying resin in the molding die before closing the molding die; closing and clamping the molding die to mold the formed coil with the resin.

(6) In the split stator manufacturing method (4), preferably, the molding die includes a first upper die for insulator and a second upper die for resin molding, which are selectively used, and a lower die, and the method further comprises: inserting a first solid resin element formed in annular shape in the lower die to surround a teeth of the split core set in the molding die, before closing the molding die; closing and clamping the molding die to heat and compress the first resin element to form the insulator; opening the molding die; changing the first upper die to the second upper die; inserting the formed coil while compressing the coil in the lower die and inserting a second solid resin element formed in annular shape in the lower die before closing the molding die; closing and clamping the molding die to heat and compress the second resin element to mold the formed coil with resin.

(7) In the split stator manufacturing method (4), preferably, the molding die includes a movable die for insulator and a movable die for resin molding which are placed on a first movable die base and common dies arranged on a second movable die base, one of the movable die bases being movable toward and apart from the other movable die base and the other movable die base being rotatable; simultaneously forming the insulator and molding the winding portion by closing and clamping the molding die once; and interchanging positions of the dies on the rotatable die base by rotation of the rotatable die base to newly form the insulator and mold the winding portion with resin at the same time.

An explanation will be given to operations and advantages of the split stator having the above configuration and its manufacturing method according to the present invention.

The split stator of the invention is arranged such that the formed coil is mounted on the teeth of the split core through the insulator and molded with resin excepting the terminal portion of the coil. The coil will cause less spring back unlike in the conventional technique. This makes it possible to control the thickness of molded resin (a resin molded portion or layer coating the coil) and can ensure insulation of the coil.

The coil is a formed coil having a desired complete shape with an outer dimension within a design value (tolerance). Accordingly, a clearance between the molding die and the coil, in which resin is allowed to flow, can be controlled with the design value, thereby controlling the thickness of the resin molded portion appropriately. It is therefore possible to prevent breakage of the resin molded portion and scattering of broken resin pieces. Since the coil is a formed coil, furthermore, it is unlikely to cause spring back and hence break the thin resin molded portion.

Further, the above split stator can be manufactured without simultaneously needing a pressing die. Reduction in manufacturing cost can be achieved accordingly.

The formed coil is mounted on the teeth of the split core through the insulator but is not subjected to pressing. It is therefore possible to prevent the insulator from becoming damaged by excessive load from the coil and hence to ensure insulation of the insulator. The insulator is made of resin with a thin thickness of for example 0.2 mm to 0.3 mm and is required to avoid any defect such as scratch, crack, pinhole, or the like.

It is further possible to mold resin into only the space for a winding portion of the coil without molding an upper part of the bus bar holder with resin, and thus reduce an amount of resin required for resin molding. The distance between the coil and the core or the distance between the split stator core and the bas bar are determined to be enough to ensure insulation. Basically, both ends of the coil and the bus bars have not been needed to be molded with resin. In a conventional method, a molding cavity is formed by placing a molding die in contact with an entire stator core particularly including eighteen coil winding portions. To mold resin only in the space for the coil winding portions, therefore, thirty-six coil terminals have to be shielded or protected from the resin molding. This needs a molding die of a complicated shape which is technically difficult to produce. In other words, two terminals of each of eighteen winding portions, that is, each periphery of thirty-six coil terminals has to be shielded. Consequently, an apparatus would be complicated in shape, which is technically difficult to produce.

The split stator in the present invention can be manufactured by molding each of eighteen winding portions with resin. It is only necessary to simply set the molding die in contact with the split stator core to form a cavity while shielding two coil terminals respectively. Consequently, the molding die can be designed relatively freely. It is therefore possible to mold resin in only the space for a winding portion and hence cut down more than 40% of an amount of resin required for the resin molding.

In the conventional manufacturing method including resin molding of an entire stator core, the stator core would be liable to cause diametrical molding shrinkage according to a large outer size. Due to distortion with a linear expansion coefficient, stress remains in a resin molded portion, which may cause cracks or the like, adversely affecting motor performance.

According to the split stator of the invention, on the other hand, adjacent split stators are not continuous. Thus, each split stator will cause molding shrinkage uniformly by an amount corresponding to a small outer size of each split stator and will be distorted with a corresponding linear expansion coefficient, with the result of less residual stress.

As compared with the conventional method of molding the entire stator core at a time, the present invention can provide a higher design freedom to a molding die at a lower die cost.

Meanwhile, the molding cavity in one resin molding is small in volume, so that resin of low fluidity can be used as it is. A motor for hybrid electric vehicle needing high torque will be supplied with relatively high voltage, thus generating a large amount of heat. Accordingly, the resin molded portion is required to have higher heat conductivity. For this end, an additive is added to the resin. This may decrease the resin fluidity, causing a technical difficulty in filling the resin in the molding cavity in every corner, particularly, in internal space (clearances) of a winding portion of the coil.

According to the split stator in the present invention, the flow length of resin can be shortened by positions of injection gates, thereby reliably filling resin in every clearances in the winding portion of the coil.

The insulator is integrally formed on the split core by resin molding. That is, the insulator is molded from resin on the split core, the formed coil is inserted in the die and then molded with resin. By such a series of processes after the split stator core is loaded in the molding die, the split stator can be manufactured consecutively.

Furthermore, in the method of the invention, the molding die includes a first upper die for insulator and a second upper die for resin molding, which are selectively used, and a lower die. The method comprises the steps of: supplying resin around a teeth of the split core before closing the molding die, and then closing and clamping the molding die to form the insulator from the resin; opening the molding die; changing the first upper die to the second upper die; inserting the formed coil in the molding die and supplying resin in the molding die before closing the molding die; closing and clamping the molding die to mold the formed coil with the resin. Accordingly, the insulator forming and the resin molding can be conducted by use of the common lower die, needing no transfer of a workpiece (the split core integrally formed with the insulator), so that a manufacturing efficiency can be enhanced.

Specifically, for example, the split stator core heated in advance is supported by a lower slide core in four side directions, the lower core being selected from various types arranged to hold a workpiece in two, three, or four side directions. In this state, liquid resin is supplied around a bottom of an insulator forming region of the split core, and an upper slide core vertically movable in the upper die is moved down to form the insulator by compression molding. Then, the upper die is switched to the other upper die for resin molding. Resin is supplied in the molding die before die closing, and the formed coil is inserted while being compressed into the die. The upper slide core is moved down to compress the supplied resin to fill resin in the coil space.

Further, in the method of the invention, the molding die includes a first upper die for insulator and a second upper die for resin molding, which are selectively used, and a lower die. The method further comprises: inserting a first solid resin element formed in annular shape in the lower die to surround a teeth of the split core set in the molding die, before closing the molding die; closing and clamping the molding die to heat and compress the first resin element to form the insulator; opening the molding die; changing the first upper die to the second upper die; inserting the formed coil while compressing the coil in the lower die and inserting a second solid resin element formed in annular shape in the lower die before closing the molding die; closing and clamping the molding die to heat and compress the second resin element to mold the formed coil with resin. Accordingly, each solid resin element has only to be inserted simply, without needing an injection molding unit. Since the resin element is heated and compressed, the upper die requires no large power for compression, thus leading to a reduction in manufacturing facility cost.

The materials for insulator and resin molded portion are provided in the form of annularly shaped solid resin elements which can be simply inserted. Thus, the above method does not need any injection and compression devices and resin discharging device for resin supply. The materials are melted by heat respectively, so that the upper die does not need a large power for compression of the materials.

The insulator forming die and the resin molding die each include a pair of dies, ones of the paired dies being different in shape and the others being common in shape. The different shaped dies are disposed on one of the first and second movable die bases and the common dies are disposed on the other movable die base. In one closing and clamping of the molding die, the insulator forming and the resin molding are simultaneously carried out. Thereafter, the positions of the dies on the rotatable die base are interchanged by rotation of that die base. The insulator forming is performed to form an insulator on another split core at the same time with the resin molding to form a resin molded portion on the split core already formed with the insulator. The above manufacturing method is suitable for mass production. As compared with the conventional stator that could be manufactured by one resin molding process, taking much time, by use of a large facility, the manufacturing method of the invention enables efficient mass production of split cores in short cycles by use of a small facility. This is efficient for a motor needing more than ten split stators.

BEST MODE FOR CARRYING OUT THE INVENTION

A detailed description of preferred embodiments of a split stator and a split stator manufacturing method embodying the present invention will now be given referring to the accompanying drawings.

Figure 1:
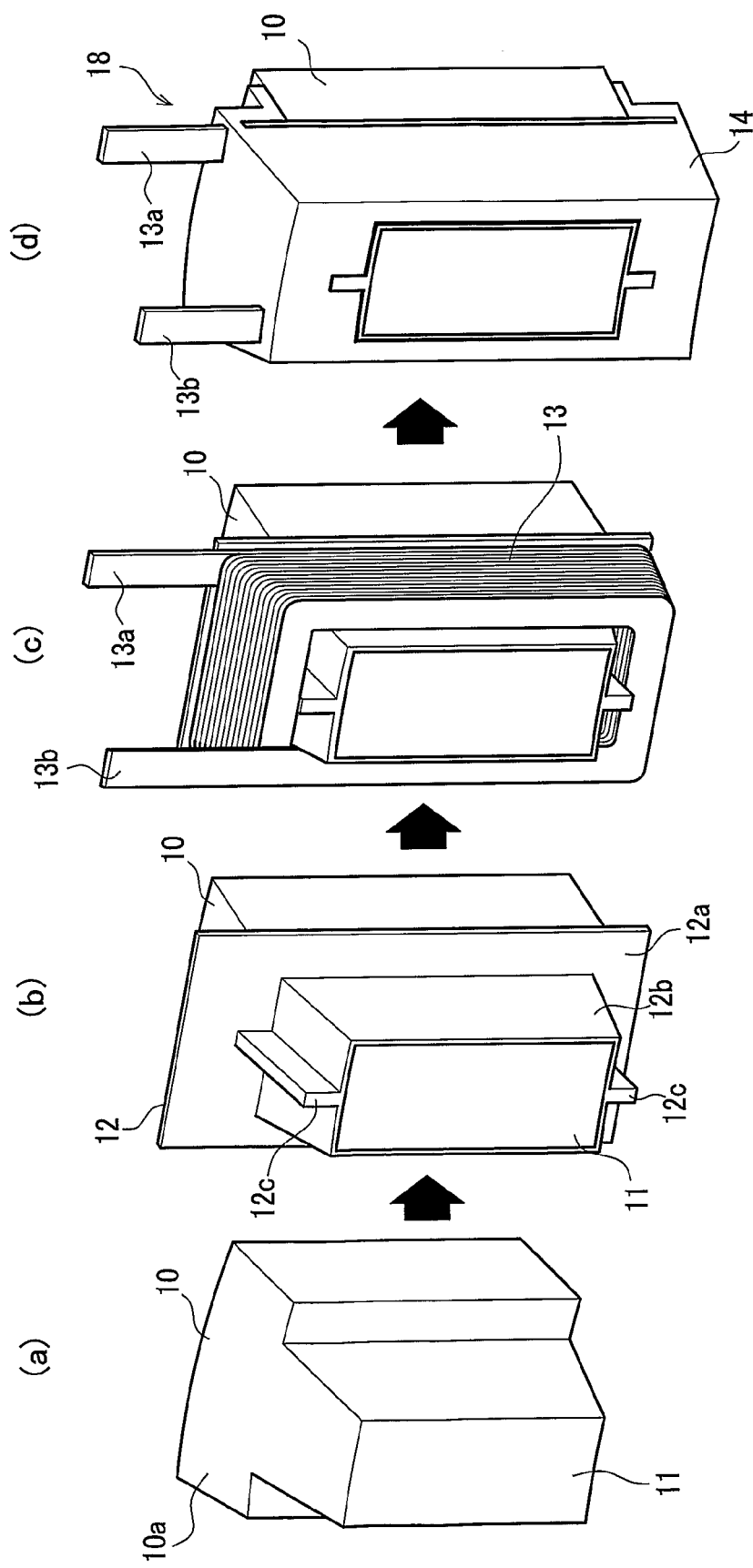
FIG. 1 is a view showing a sequence of manufacturing a split stator in a first embodiment of the invention.

FIG. 1 shows a sequence of manufacturing a split stator. A split stator core (hereinafter, referred to as a "split core") 10 includes an arc-shaped base portion 10a and a teeth 11 protruding therefrom so that a formed coil is to be mounted around the teeth 11. This split core 10 is made by laminating steel sheets produced by press-punching. Herein, eighteen split cores 10 are to be assembled together to form an annular stator core so that the arc-shaped base portions 10a are circularly arranged with the teethes 11 each protruding radially inwardly. This split core 10 is shown in a state (a) of FIG. 1. In a state (b) of FIG. 1, an insulator 12 is fitted on the teeth 11 of the split core 10. The insulator 12 includes a rectangular sleeve part 12b which covers the teeth 11, a flange 12a which covers an inner surface of the base portion 10a other than the teeth 11 and vertically extends larger than the base portion 10a, and two ribs 12c protruding upward and downward from the sleeve part 12b. In particular, the thickness of each side wall of the insulator 12 is 0.2 mm to 0.3 mm in the embodiment.

A state (c) of FIG. 1 shows that a formed edgewise coil 13 is mounted on the teeth 11 through the sleeve part 12b of the insulator 12. The edgewise coil 13 is made of a coil wire having a flat rectangular cross section and being wound by edgewise bending into a hollow shape with an inner diameter along the shape of the teeth 11.

The edgewise coil 13 is placed in close contact with the split core 10 through the flange 12a. The edgewise coil 13 is positioned in place in a lateral direction by the teeth 11 through the sleeve part 12b and in a vertical direction by the ribs 12c of the insulator 12. Accordingly, the edgewise coil 13 is held in a fixed position relative to the split core 10. The edgewise coil 13 includes a long end 13a extending upward from a position close to the flange 12a and a long end 13b extending upward from a position close to a distal end face of the teeth 11. The long ends 13a and 13b serve as coil terminals.

In the present embodiment, the edgewise coil 13 is a formed coil. However, other types of coils having for example circular section, rectangular section, or others, may be adopted if only a coil has a completely formed shape.

Figure 3:
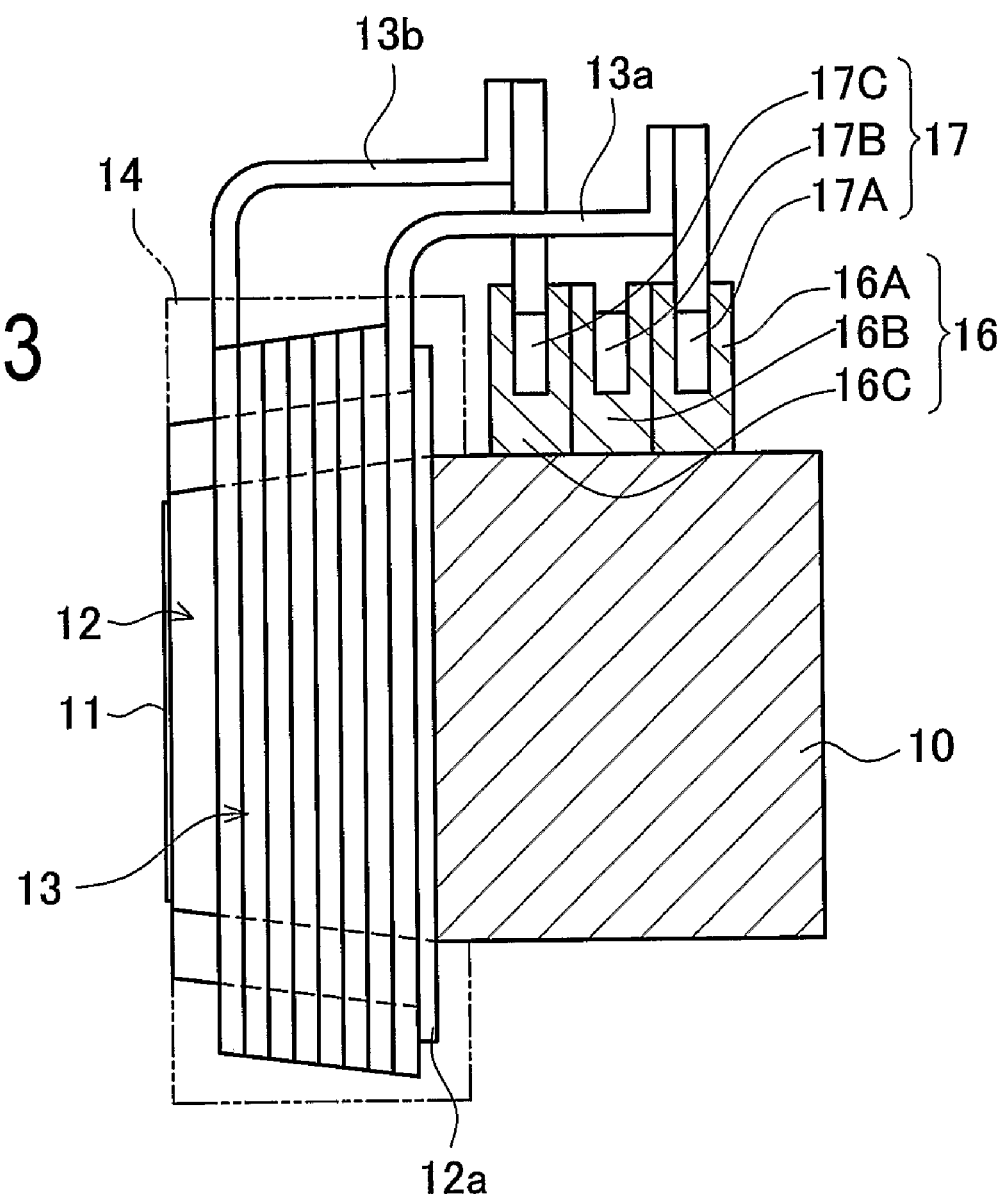
FIG. 3 is a sectional view of the split stator.

A state (d) of FIG. 1 shows a split stator 18 molded with resin. In this figure, the edgewise coil 13 is coated with a resin molded portion (layer) 14. A resin molding technique thereof will be mentioned in detail later. The pair of long ends 13a and 13b protrudes out of the resin molded portion 14 of the split stator 18. FIG. 3 is a sectional view of the resin-molded split stator 18, showing a positional relationship between the edgewise coil 13 and the resin molded portion 14.

The edgewise coil 13 is mounted on the split core 10 with the insulator 12 interposed therebetween, and then the resin molded portion 14 is formed to coat only a winding portion of the edgewise coil 13. FIG. 3 shows a state where a bus bar holder 16 (16A, 16B, 16C) made of resin for holding a bus bar 17 (17A, 17B, 17C) is fixed on the split core 10. To this bus bar 17, the long end 13a or 13b is connected in bent form.

Figure 2:
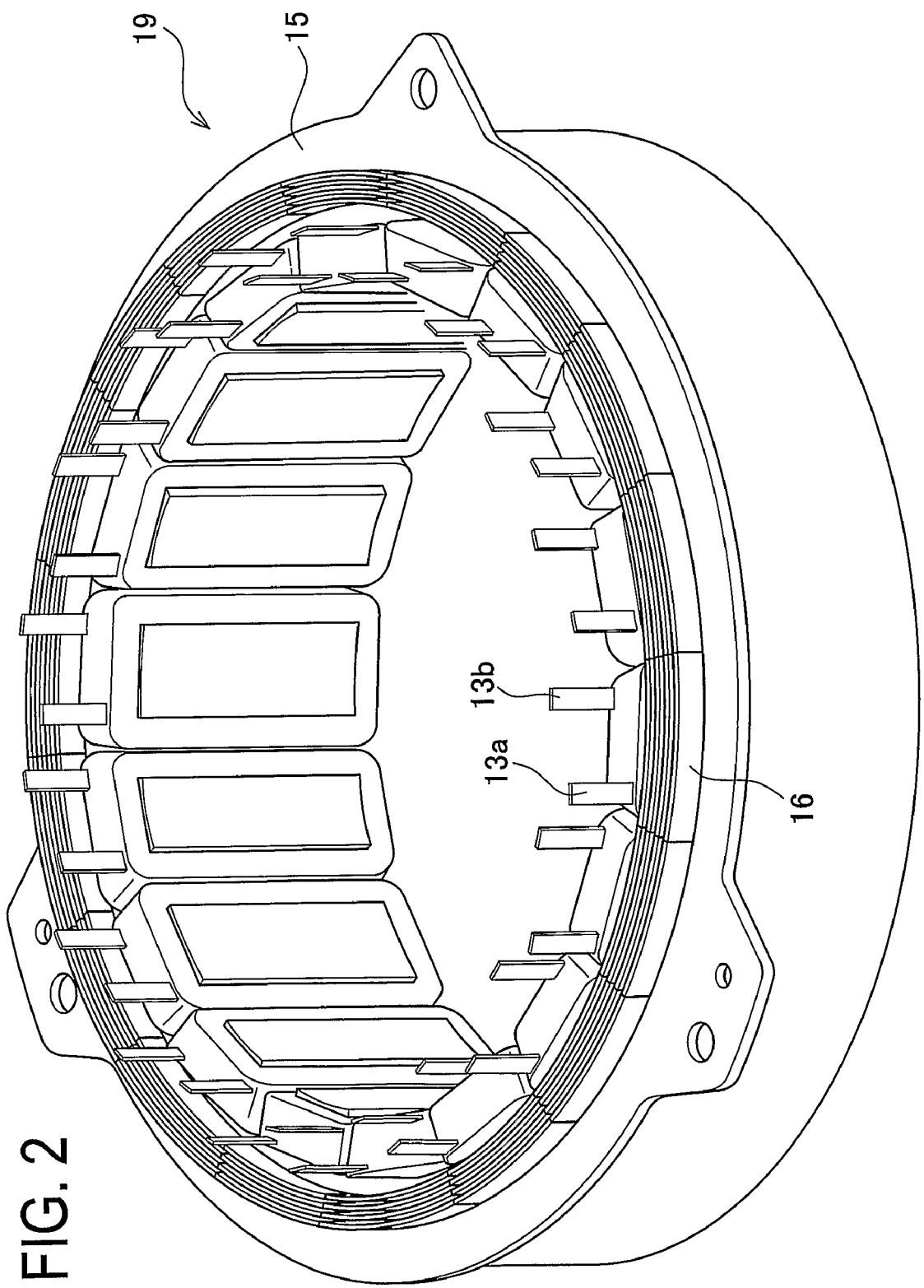
FIG. 2 is a view showing a stator constituted of eighteen split stators and fitted in an outer ring by shrink fitting.

FIG. 2 shows a stator 19 in which the eighteen split stators 18 are assembled together. FIG. 3 shows the sectional view of each split stator 18.

The eighteen split stators 18 are assembled in annular form, and an outer ring 15 heated and expanded in inner diameter is set around the split stators 18. Then, this assembly is cooled to a normal temperature, causing the outer ring 15 to shrink, decreasing its inner diameter. The eighteen split stators 18 are then constricted integrally to form the stator 19. This technique is a so-called shrink fitting of an outer ring.

In a next step, not shown, the long end 13a of one split stator 18 is connected with the long end 13b of a third split stator 18 by skipping two split stators 18 to the left by means of the bus bars 17 in the holders 16. The long ends 13a and 13b of the eighteen split stators 18 are appropriately connected in this way through the bus bars 17 in the holders 16 to constitute a motor coil with three U, V, and W phases.

Figure 4:
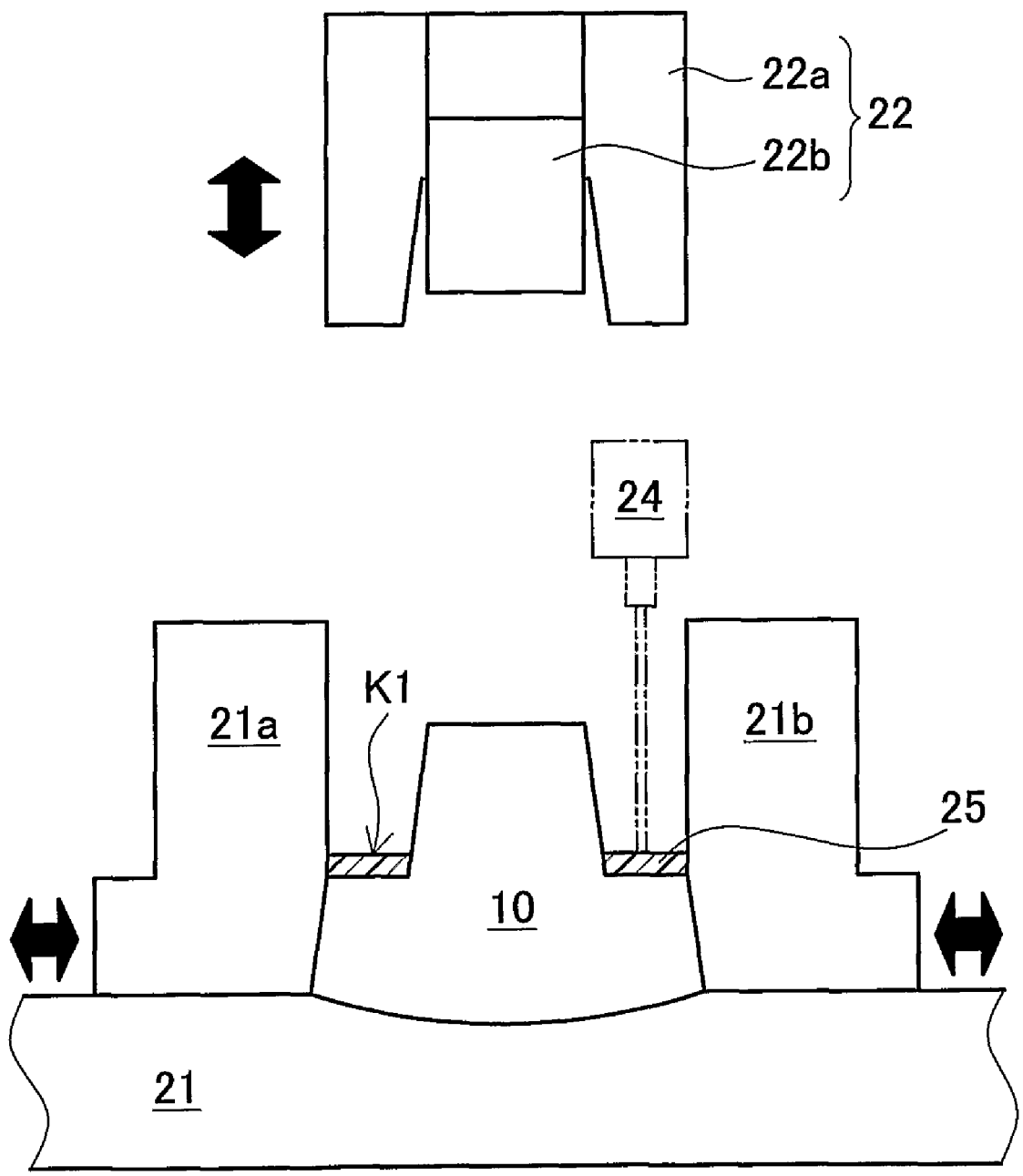
FIG. 4 is a view showing a structure of a molding die for forming an insulator.
Figure 5:
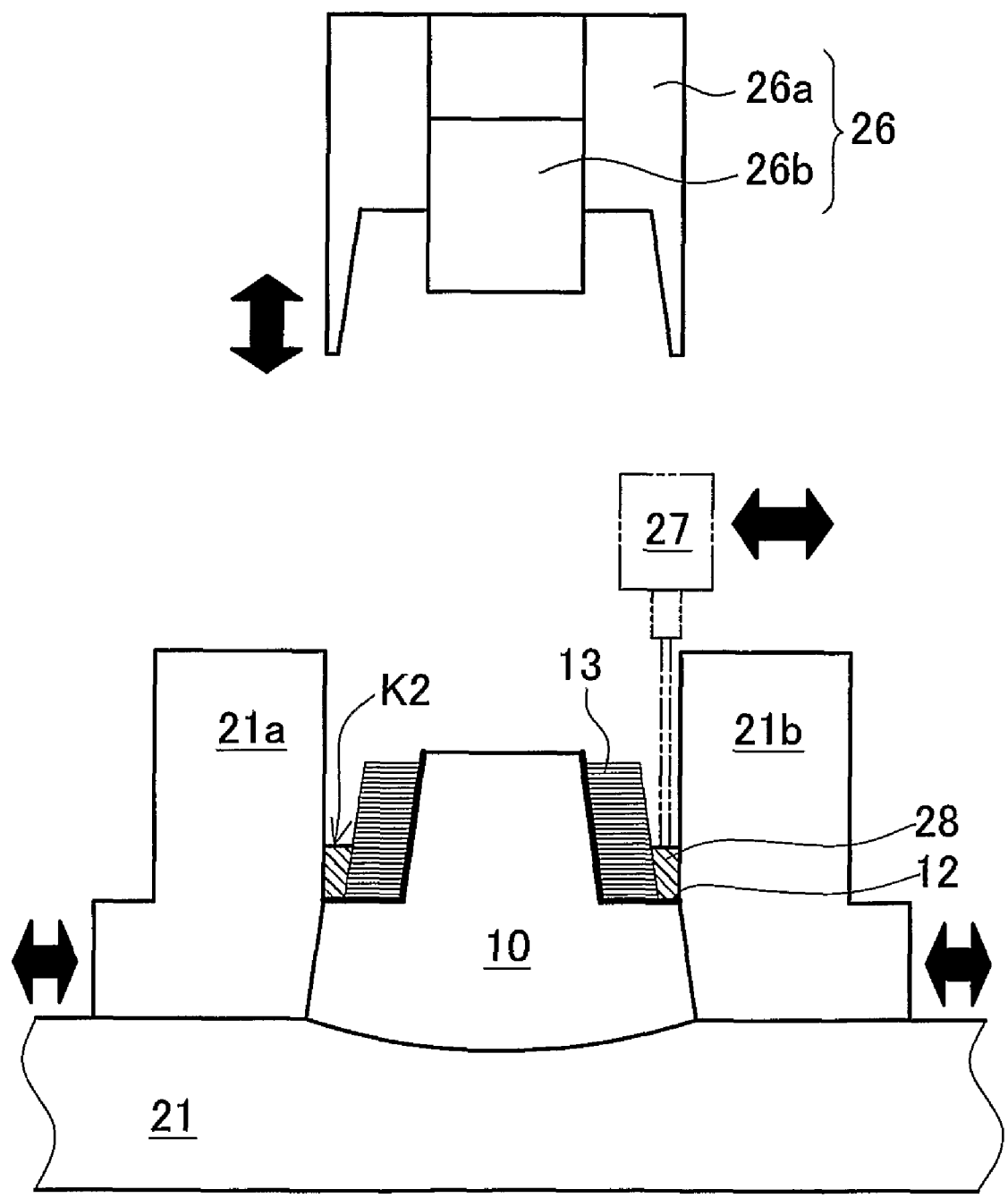
FIG. 5 is a view showing a structure of a molding die for forming a resin molded portion.

A method of manufacturing the split stator 18 will be explained below. FIG. 4 shows a structure of a molding die for forming the insulator 12. FIG. 5 shows a structure of a molding die for forming the resin molded portion 14. For easy viewing, those figures are not applied with hatching lines indicating sections.

As shown in FIG. 4, the split core 10 is held by a lower die 21 in four side directions (only two of them are shown), using an appropriate slide core selected from various slide cores configured to hold a workpiece in two, three, or four sides directions. In this figure, specifically, the core 10 is fixedly held between a pair of lower slide cores 21a and 21b. From this state, an upper die (a first upper die) 22 is moved down. This upper die 22 includes a guide core 22a and a leading slide core 22b which is guided by the guide core 22a to vertically slide. The slide core 22b is urged downward by a spring or the like. A supply device 24 is disposed between the upper die 22 and the lower die 21 so as to be movable to a standby position.

An insulator forming process is explained below.

(1) In a state where the lower slide cores 21a and 21b are opened by moving apart from each other, the split core 10 is loaded therebetween. The slide cores 21a and 21b are then closed by moving toward each other to hold the split core 10 in place from either side thereof. The split core 10 has been heated in advance.

(2) The upper die 22 stays in an open position and the supply device 24 is moved once around the teeth 11 to supply a required amount of a high heat-conductive material such as epoxy resin as an insulator material 25 into a cavity K1. FIG. 4 shows a state after the insulator material 25 is supplied. After resin supply, the supply device 24 is moved to its standby position.

(3) The upper die 22 is then moved downward until the leading slide core 22b comes into contact with a distal end face of the teeth 11. In this state, the split stator 10, the lower slide cores 21a and 21b, the guide core 22a, and the leading slide core 22b define the cavity K1.

(4) Subsequently, the guide core 22a is further moved downward, providing a cavity for forming the insulator 12. The insulator material 25 is molded into the insulator 12 as shown in FIG. 1(b).

(5) After the insulator material 25 is solidified, the upper die 22 is moved upward.

Next, a structure of a molding die for resin molding the edgewise coil 13 will be explained below. As shown in FIG. 5, the lower die 21 and the lower slide cores 21a and 21b are the same in structure as those in FIG. 4. A guide core 26a of an upper die (a second upper die) 26 is the same as the guide core 22a in FIG. 4. A leading slide core 26b which is guided by the guide core 26a to vertically slide has a lower surface for forming a cavity of different shape from the slide core 22b in FIG. 4. The slide core 26b is urged downward by a spring or the like. A supply device 27 is disposed between the lower die 21 and the upper die 26 so as to be movable to a standby position.

Figure 10:
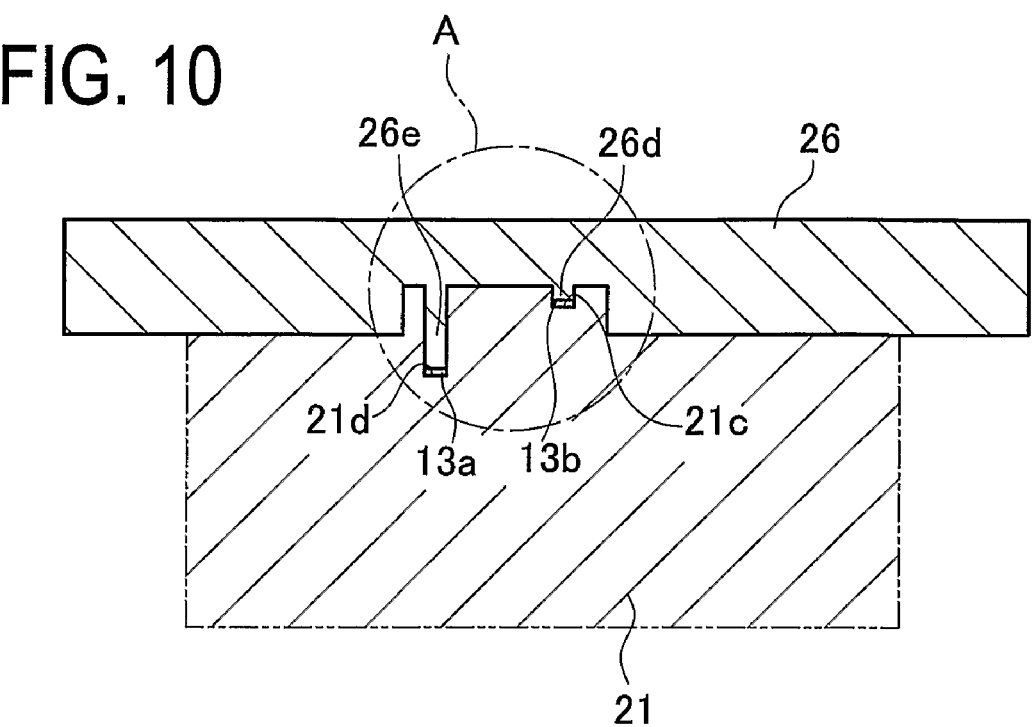
FIG. 10 is a sectional view showing a shielding structure of a long end.

In the resin molding process for molding the coil 13 with resin (herein, also referred to as a "coil resin-molding" process), molding is performed after the edgewise coil 13 is set in a cavity K2. Accordingly, the long ends 13a and 13b of the edgewise coil 13 have to be shielded in an appropriate manner. A shielding structure is shown in FIG. 10. In this embodiment, in order to allow automatic setting of the edgewise coil 13 in the resin molding die, the molding die is designed to shield over the long ends 13a and 13b serving as coil terminals up to respective proximal portions.

The lower die 21 is formed with a deep groove 21d at a position to receive the long end 13a of the edgewise coil 13 extending from the cavity of the lower die 21. Correspondingly, the upper die 26 is formed with a long protrusion 26e. Those deep groove 21d and long protrusion 26e shield the periphery of the long end 13a.

The lower die 21 is further formed with a shallow groove 21c at a position to receive the long end 13b extending from the cavity. The upper die 26 is correspondingly formed with a short protrusion 26d. Those shallow groove 21c and short protrusion 26d shield the periphery of the long end 13b. For preventing damage to a surface layer of the coil, the dies are provided, on contact surfaces, with a cushioning member such as elastomer as needed.

Figure 11:
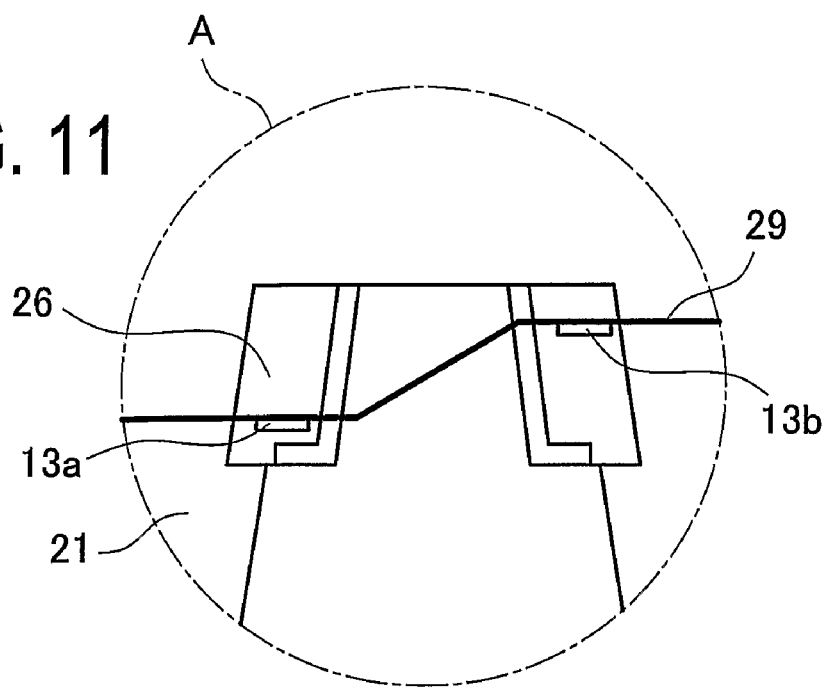
FIG. 11 is a sectional view showing another shielding structure of a long end.

FIG. 11 shows another shielding structure, corresponding to only a circled portion A indicated with a dashed line in FIG. 10. In this method, a parting line 29 between the upper die 26 and the lower die 21 is defined as an inclined (stepped) plane, not a flat plane, between the long ends 13a and 13b existing at different levels in section. Accordingly, this method enables shielding of the periphery of each long end 13a, 13b without forming the long protrusion 26e.

The coil resin-molding process is explained below.

(1) In a state where the lower slide cores 21a and 21b are opened by moving apart from each other, the split core 10 with the molded insulator 12 is loaded therebetween. The slide cores 21a and 21b are then closed by moving toward each other to hold the split core 10 from either side thereof. The split core 10 has been heated in advance. The formed edgewise coil 13 is then inserted in the lower die 21 and set on the core 10.

The upper die 26 stays in an open position and the supply device 27 is moved once around the teeth 11 (the coil 13) to supply a required amount of a resin molding material 28 forming the resin molded portion 14 into the cavity K2. FIG. 5 shows a state where the resin molding material 28 has been supplied. After resin supply, the supply device 27 is moved to its standby position.

(3) The upper die 26 is moved downward until the leading slide core 26b comes into contact with the distal end face of the teeth 11. In this state, the split stator core 10, the lower slide cores 21a and 21b, the guide core 26a, and the leading slide core 26b define the cavity K2.

(4) Subsequently, the guide core 26a of the upper die 26 is further moved downward, providing a cavity for forming the resin molded portion 14. The cavity K2 includes the edgewise coil 13 and is larger than the cavity K1. The resin molding material 28 is supplied in the cavity K2 and molded into the shape of the resin molded portion 14 as shown in FIG. 1 (*d*).

(5) After the resin molding material 28 is solidified and then the upper die 26 is moved upward.

As explained above in detail, the split stator 18 in the present embodiment is manufactured in such a manner that the formed edgewise coil 13 is fitted on the teeth 11 of the split core 10 through the insulator 12 and molded with the resin molded portion 14 excepting the long ends 13*a* and 13*b* of the edgewise coil 13. Thus, the insulation of the coil 13 can be enhanced.

The edgewise coil 13 has previously been formed in a desired shape with an outer diameter (dimension) within a design value (tolerance). Accordingly, a clearance for resin inflow between the molding die and the coil can be controlled with the design value. This makes it possible to prevent contact between the molding die and the coil and formation of an extreme thin layer of the resin molded portion, and further avoid breakage of the resin molded layer or portion and scattering of broken resin pieces.

The edgewise coil 13 is a formed coil from which residual stress caused by forming into a predetermined shape has been removed by heat treatment or the like. Accordingly, such a formed coil is unlikely to cause spring back and break a thin resin molded portion or layer.

Further, the above method can be achieved simply without simultaneously needing the pressing. Reduction in manufacturing cost can be achieved accordingly.

The formed coil is mounted on the teeth of the split core through the insulator but is not subjected to pressing. It is therefore possible to prevent the insulator from becoming damaged by excessive load from the coil and hence to ensure insulation of the insulator.

It is further possible to mold resin in only the space (cavity) for a winding portion of the coil 13 and thus reduce an amount of resin required for coil resin-molding.

Conventionally, both ends of each coil and the bus bars are spaced at sufficient distances to ensure insulation and thus the resin molding (a resin molded portion) has not been needed for both ends of the coil and the bus bar. Further, a molding cavity is heretofore formed by placing a molding die in contact with an entire stator core particularly including eighteen winding portions. To mold resin only in space for the winding portions, however, thirty-six coil terminals have to be shielded. This needs a molding die of a complicated shape which is technically difficult to form.

On the other hand, the split stator in the present embodiment is manufactured by molding or coating each of eighteen winding portions with resin while shielding just two coil terminals respectively. It is therefore possible to reliably mold resin in only the space for a winding portion and hence cut down more than 40% of an amount of resin required for the coil resin-molding.

Figure 15:
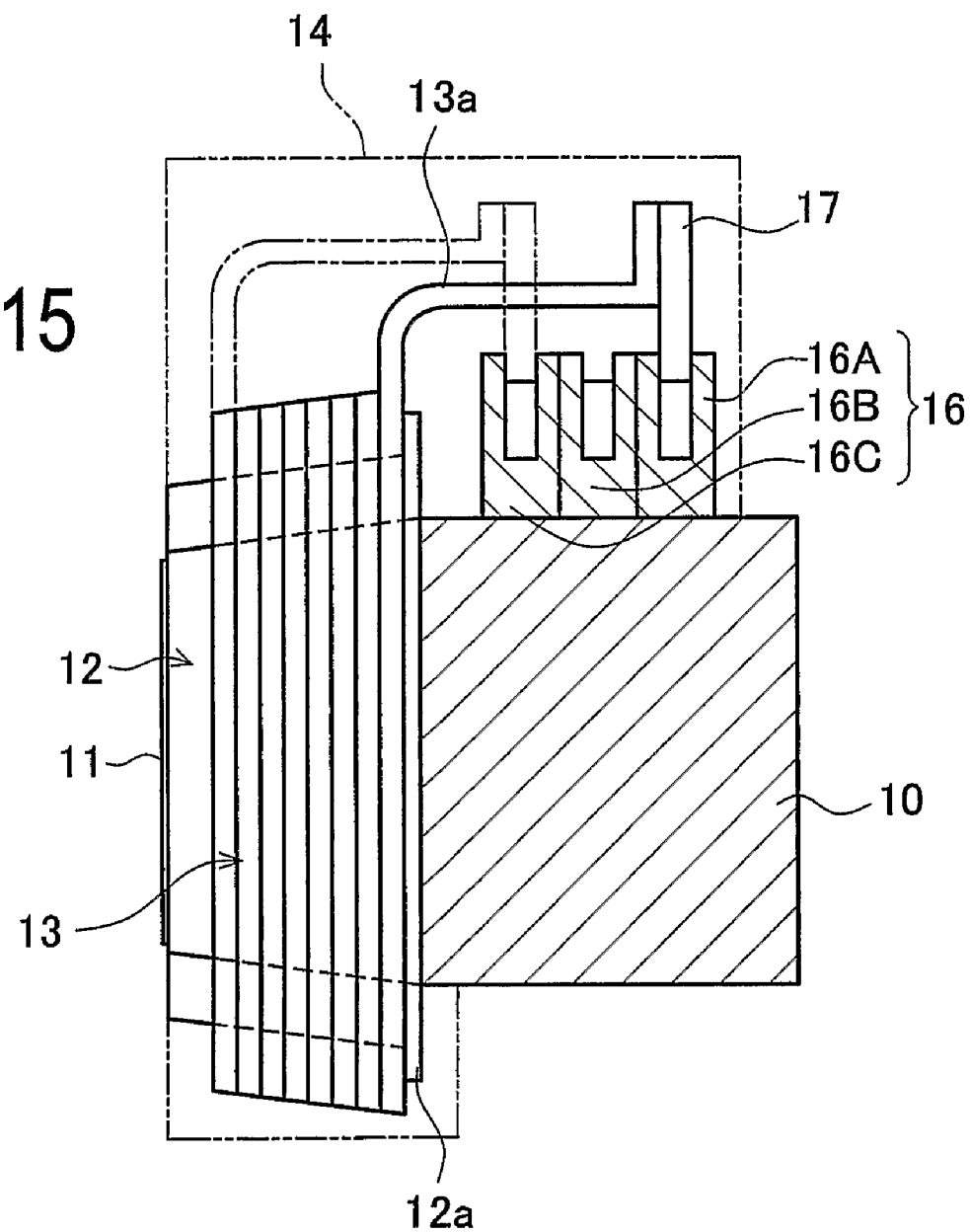
FIG. 15 is a sectional view of a conventional stator.

FIG. 15 is a sectional view showing a conventional resin molding state. The conventional resin molded portion 14 is applied not only to fill in the space for a winding portion of the edgewise coil 13 but also to coat the bus bars 17 together. As compared to FIG. 15, the configuration in FIG. 3 shows that more than 40% of the resin molding material can be reduced.

In the present embodiment, the molding cavity for one resin molding is small, so that resin of low fluidity can be used as it is.

A motor for hybrid electric vehicle needing high torque will be supplied with relatively high voltage, thus generating a large amount of heat. Accordingly, the resin molded portion is required to have higher heat conductivity. For this end, an additive is added to the resin. This would decrease the resin fluidity, which causes a technical difficulty in filling the resin in the molding cavity in every corner, particularly, in internal space (clearances) of a winding portion of the coil.

According to the split stator manufacturing method in the present embodiment, the molding cavity is smaller in volume than conventional one, so that resin can reliably be filled in every clearances in the winding portion of the coil. The heat generated in the coil can therefore be released outside at high efficiency through the resin molded portion.

As compared to the method including simultaneously molding the entire stator core with resin, the method in the present embodiment can be achieved by shielding just two coil terminals. This can simplify design of a molding die and reduce a die cost.

The insulator 12 is integrally formed on the split core 10 by resin molding. By a series of processes following loading the split core 10 in the lower die 21 and including: molding the insulator 12 from resin on the split core 10; mounting the edgewise coil 13 on the teeth 11; and molding the coil 13 with resin to form the resin molded portion 14, the split stators 18 can be manufactured consecutively.

Figure 6:
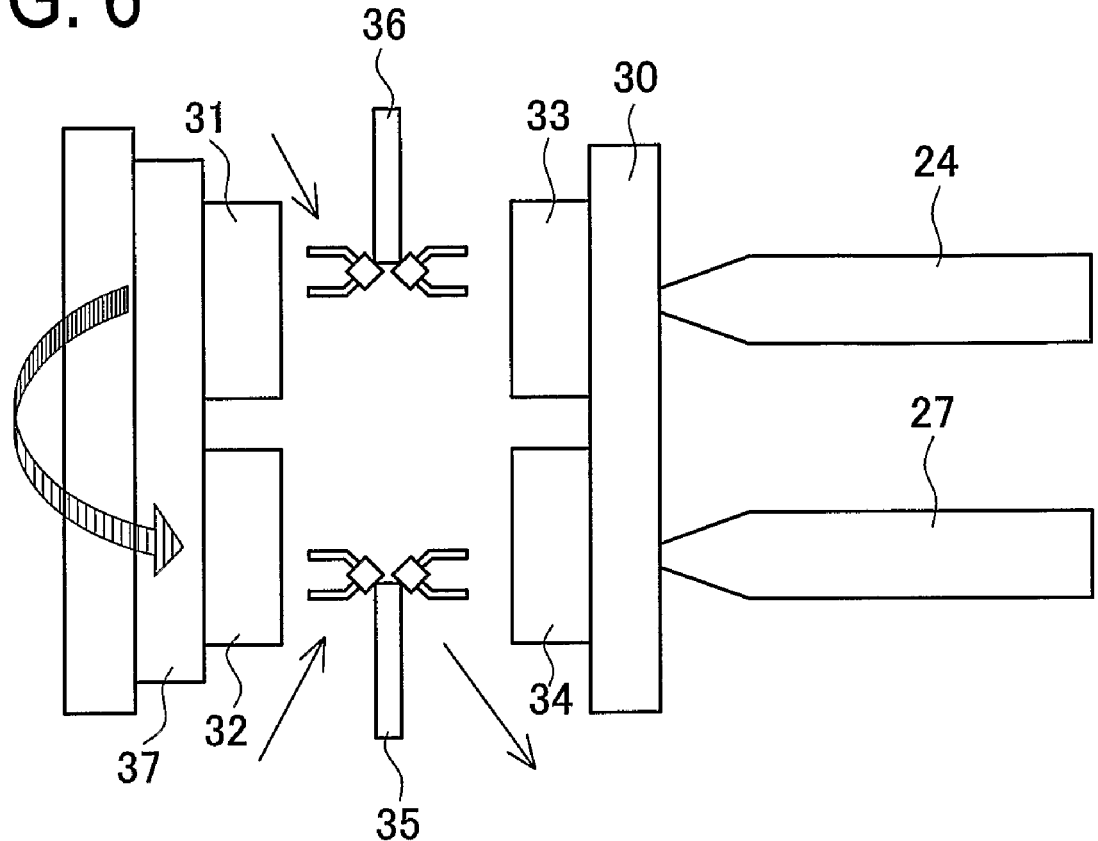
FIG. 6 is a view showing a structure of a system for simultaneously performing an insulator forming process and a resin molding process in a second embodiment.

A second embodiment will be explained below to show a system for simultaneously performing the insulator forming (molding) process and the coil resin-molding process. FIG. 6 shows a structure of the system in the second embodiment.

On an upper die base 30, a plurality of upper die sets 33 for insulator forming (each including the upper die 22) and a plurality of upper die sets 34 for resin molding (each including the upper die 26) are arranged for providing multiple cavities. The upper die base 30 is movable toward and apart from a rotatable platen 37.

The supply device 24 for supplying the insulator forming material and the supply device 27 for supplying the resin-molded-portion forming material are not illustrated for convenience.

In the insulator forming (molding) process shown in FIG. 4 and the coil resin-molding process shown in FIG. 5, the same lower die 21 and lower slide cores 21*a* and 21*b* (which are referred to as a lower die set) are used in common. Accordingly, a pair of lower die sets 31 and 32 is arranged symmetrically about the central axis of the platen 37 that is rotatable 180 degrees.

Further, a carrier device 36 is provided to chuck and carry the split core 10 to supply it into the lower die set 31. A carrier device 35 is also provided to chuck and carry the formed edgewise coil 13 into the lower die set 32 and chuck and take the split stator 18 out of the lower die set 32. The carrier devices 36 and 35 are arranged in one-to-one correspondence with the lower die sets 31 and 32 respectively.

Figure 7:
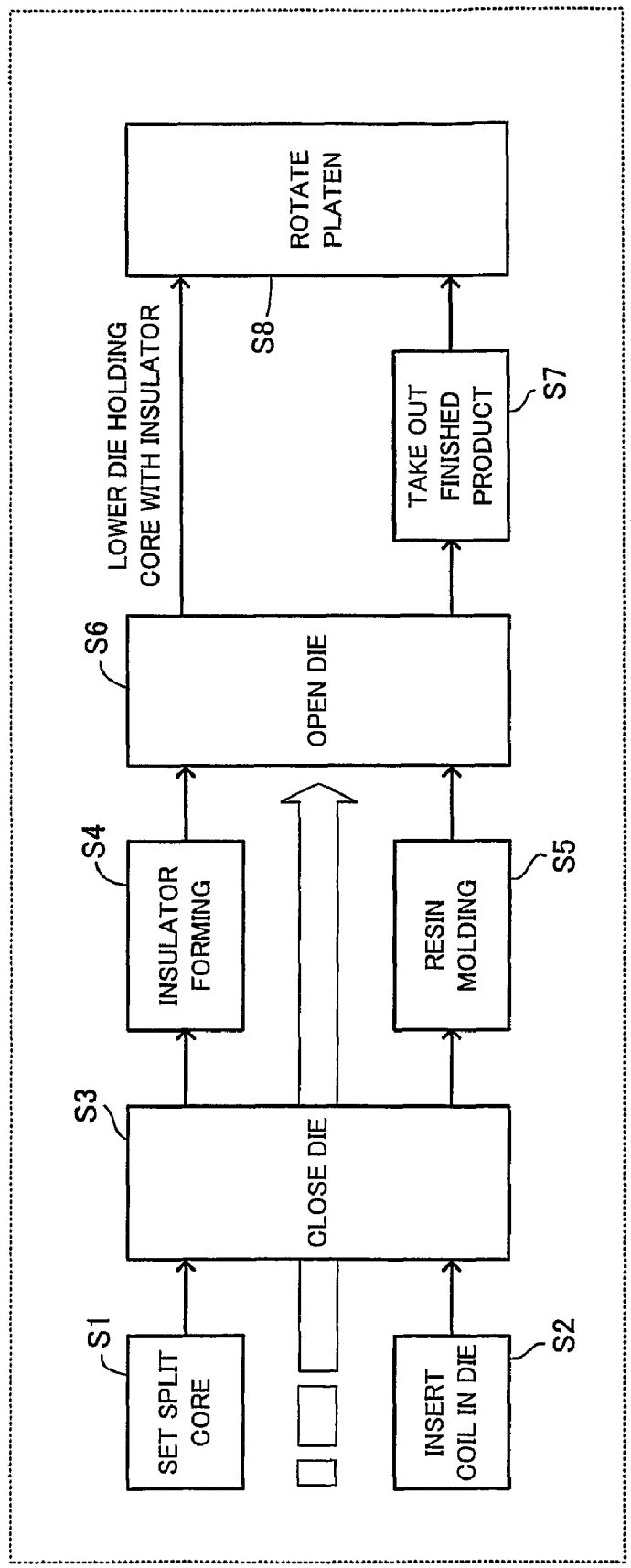
FIG. 7 is a flowchart showing an operating method of the system in FIG. 6.

FIG. 7 is a flowchart showing an operation of the system in FIG. 6.

While the upper die base 30 is in a position apart from the platen 37, that is, in a die opening position, the carrier device 36 is driven to load the split core 10 in the lower die set 31 (S1). At the same time, the carrier device 35 is driven to insert the edgewise coil 13 in the lower die set 32 (S2).

The upper die base 30 is moved toward the platen 37 to a die closing position (S3). With the lower die set 31 and the upper die set 33, the insulator forming is performed (S4) as explained referring to FIG. 4. At the same time, with the lower die set 32 and the upper die set 34, the resin molding is conducted (S5) as explained referring to FIG. 5. After completion of both processes, the upper die base 30 is moved apart from the movable plate 37 to a die opening position (S6). The carrier device 35 takes the finished split stator 18 out of the lower die set 32 (S7).

The platen 37 is then rotated 180 degrees (S8), thereby interchanging the positions of the lower die sets 31 and 32, that is, moving the lower die set 31 to a position facing the upper die set 34 and moving the lower die set 32 to a position facing the upper die set 33.

At that time, the lower die set 31 remains holding the split core 10 formed integral with the insulator 12, but the lower die set 32 is empty. Thus, a new edgewise coil 13 is inserted in the lower die set 31 by the carrier device 35 and a new split core 10 is loaded in the lower die set 32 by the carrier device 36 respectively. The same operations as above are repeated.

As descried above in detail, according to the second embodiment, the split stator 18 is manufactured by supplying resin around the teeth 11 of the split core 10 in the lower die 21 before die closing; closing and clamping the upper die 22 (the upper die base 30) to mold the resin into the insulator 12 by the insulator forming upper die 22; opening the upper die base 30; changing the position of the concerned core 10 to the other position facing the resin molding upper die 26 by rotation of the platen 37; inserting the edgewise coil 13 in the lower die 21 and supplying resin therein; and closing and clamping the upper die 26 (the upper die base 30) to mold the resin into the shape of the resin molded portion 14. Accordingly, the insulator 12 and the resin molded portion 14 can be formed by use of the same lower die 21, eliminating the need to transfer a workpiece (the split core 10 integrally formed with the insulator 12) itself, thus enhancing a manufacturing efficiency.

Specifically, the split core 10 heated in advance is held from both sides thereof by the pair of lower slide cores 21a and 21b. Liquid resin is supplied in the cavity K1 for forming the insulator 12 with respect to the split core 10. Then, the guide core 22a and the slide core 22b are moved downward to mold the insulator 12.

Subsequently, the edgewise coil 13 is fitted on the insulator 12, liquid resin is supplied around the edgewise coil 13, and the upper die 26 is moved down to mold the supplied resin molding material in the space for the winding portion. The above processes allow an increase in manufacturing efficiency.

Further, the pair of lower die sets 31 and 32 are arranged on the same rotatable platen 37. The insulator forming and the coil resin-molding are simultaneously performed by a single closing and clamping operation of the upper die base 30. Subsequently, the lower die sets 31 and 32 are positionally interchanged each other to simultaneously perform the coil resin-molding with one lower die set that holds a split core integral with an insulator and perform the insulator forming with the other lower die set that holds a new split core. This manufacturing method is suitable for mass production. Because one motor needs eighteen split stators, particularly, a large quantity of the split stators have to be efficiently manufactured. The manufacturing method of the present embodiment is therefore effective for such case as compared with the conventional stator that would be finished by a single resin molding operation.

A third embodiment will be explained below. This embodiment is basically the same as the first embodiment and thus will be described with a focus on differences therefrom without repeating the same explanation.

Figure 13:
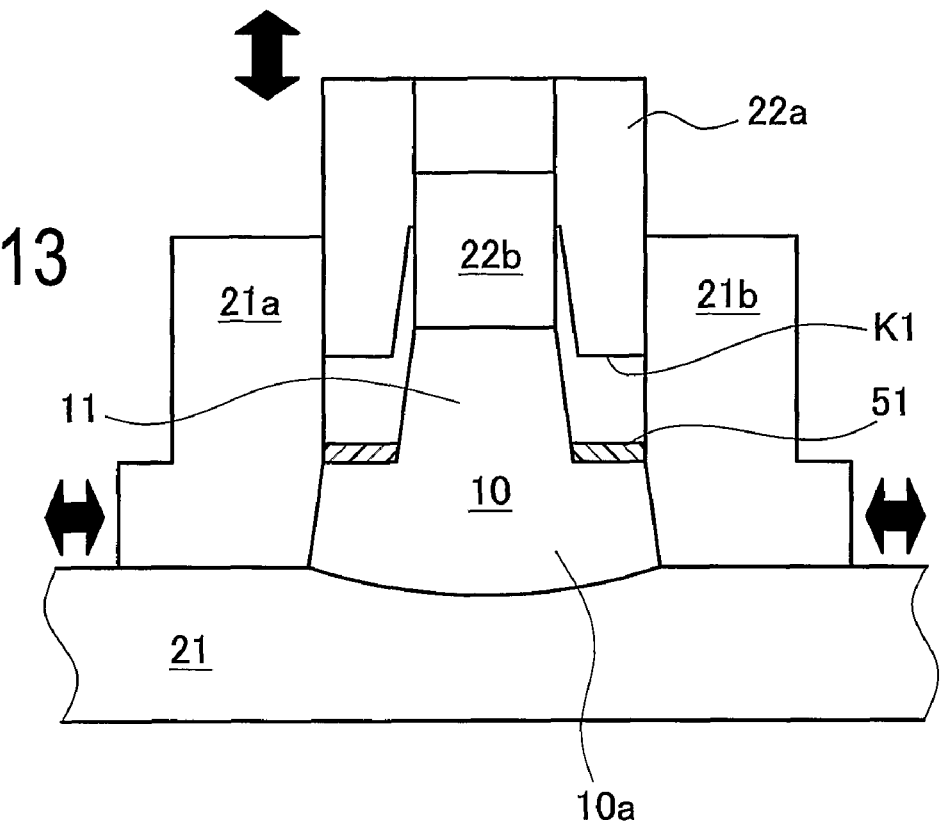
FIG. 13 is a view showing the insulator forming process in the third embodiment.

FIG. 13 shows an insulator forming process. This differs from that in the first embodiment in that the supply device 24 is not used and an annular solid resin element 51 for forming an insulator is placed on the inner surface of the base portion 10a of the split core 10. The solid resin element 51 is a material tablet made of the insulator forming material shaped in a rectangular ring form.

This solid resin element 51 is melted when put on the previously heated split core 10. Simultaneously, the guide core 22a and the leading slide die 22b moving downward to form the insulator cavity K1 compress and mold the molten resin into the shape of the insulator 12.

Figure 14:
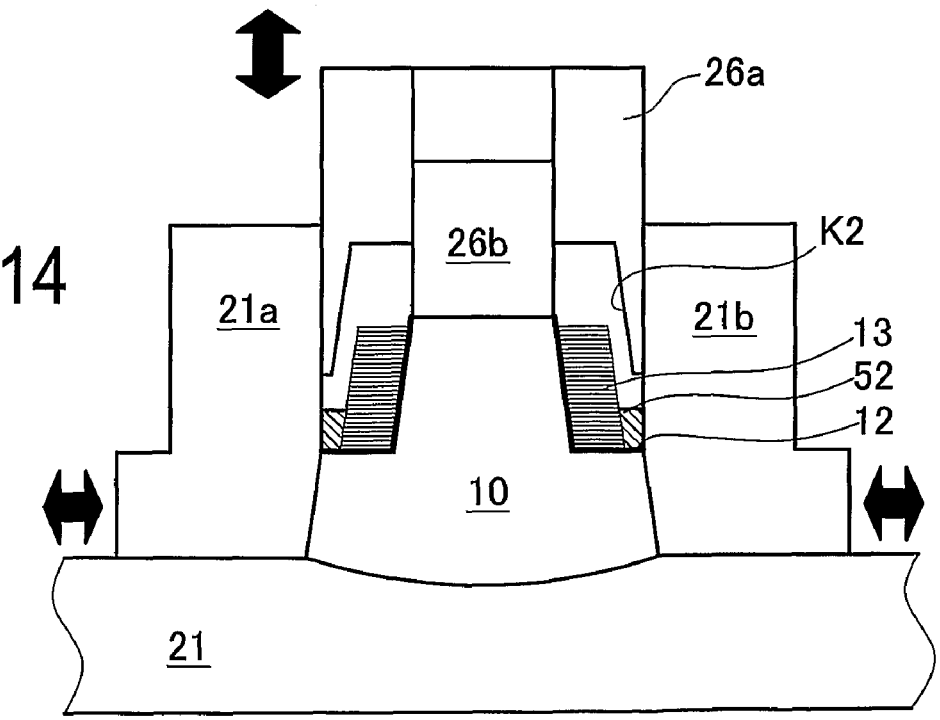
FIG. 14 is a view showing the resin molding process in the third embodiment.

FIG. 14 shows a coil resin-molding process. This differs from that in the first embodiment in that the supply device 27 is not used and an annular solid resin element 52 for resin molding is put on the insulator 12 formed on the split core 10. Another difference is in that the annular solid resin element 52 is placed around the edgewise coil 13 after the coil 13 is mounted on the split core 10. The solid resin element 52 is made of a material tablet made of the resin molding material shaped in a rectangular ring form.

Herein, the edgewise coil 13 having been heated in advance before being mounted on the core 10 is fitted while being compressed onto the teeth 11 (the insulator 12). Thus, the solid resin element 52 when inserted in the lower die 21 so as to surround the coil 13 is heated and melted by the heat of the coil 13.

The guide core 26a and the slide core 26b are then moved downward to form the cavity K2 for resin molding, compressing the molten resin into the space for the winding portion of the coil 13 to mold the resin into the shape of the resin molded portion 14.

Figure 12:
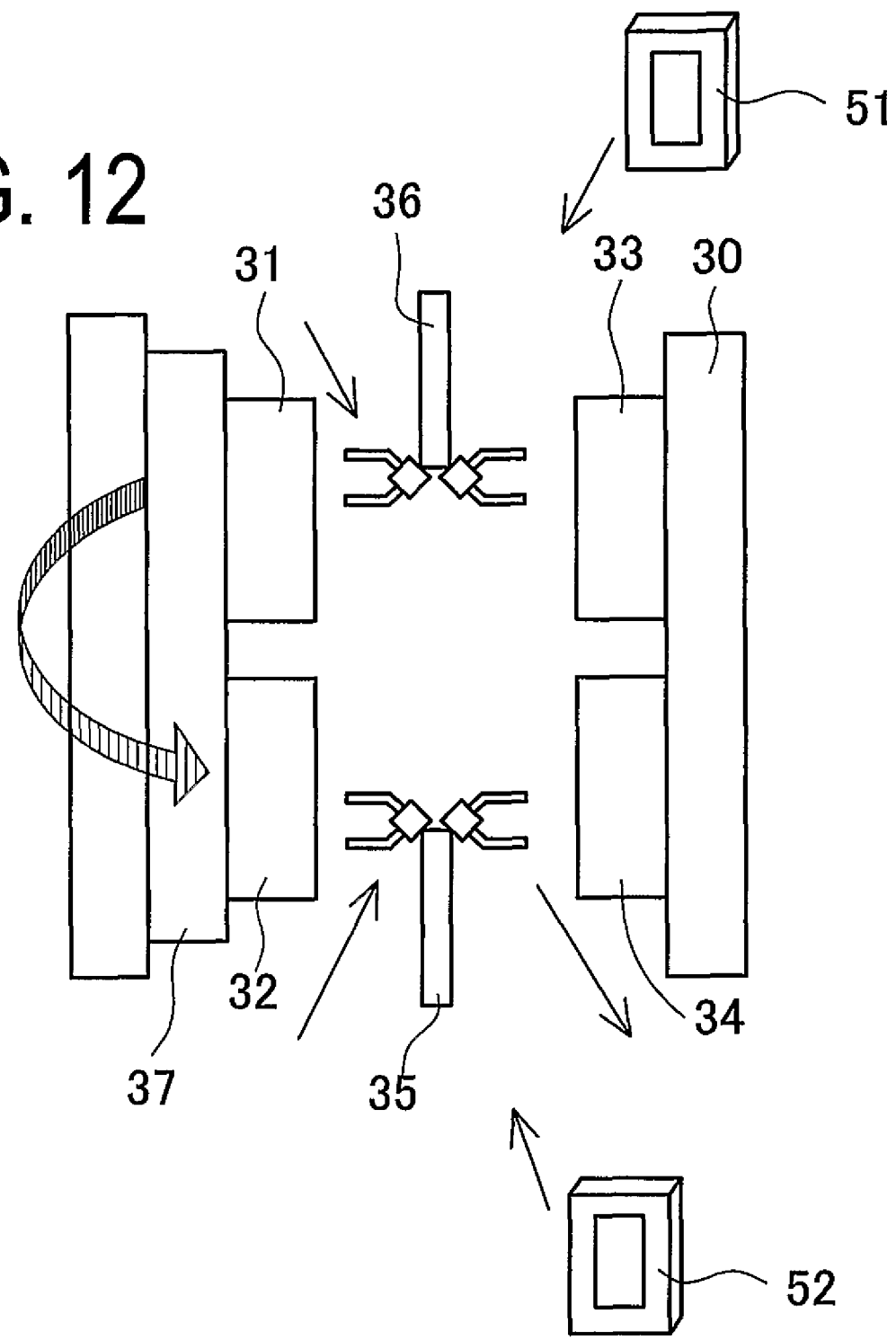
FIG. 12 is a view showing a structure of a system for simultaneously performing an insulator forming process and a resin molding process in a third embodiment.

The third embodiment also adopts the system of simultaneously performing the insulator forming process and the resin molding process. FIG. 12 is a view showing a structure of the system.

This structure is basically the same as in FIG. 6 and will be explained with a focus on differences therefrom.

The solid resin element 51 for insulator is inserted to surround the split core 10 by the carrier device 36. The solid resin element 52 for resin molding is inserted to surround the split core 10 with the coil 13 mounted thereon by the carrier device 35.

The following advantages can be obtained in the third embodiment.

According to the split stator manufacturing method in the third embodiment, the annular solid resin element 51 is fitted on the teeth 11 of the split core 10 before die closing, and the resin element 51 is heated and compressed to form the insulator 12. After the die opening, the edgewise coil 13 is set in the lower die 21 and further the annular solid resin element 52 is inserted before die closing, and the resin element 52 is melted and compressed to mold or coat the edgewise coil 13 with resin. As above, the solid resin elements 51 and 52 have only to be inserted simply and thus the pressure supply devices 24 and 27 are not required. Further, the solid resin elements 51 and 52 are heated by the previously heated split core 10 and edgewise coil 13 respectively and then compressed by the upper and lower dies 21. No large power is required to drive the upper dies 22 and 26, resulting in a reduction of manufacturing facility cost.

In other words, the material for the insulator 12 and the material for the resin molded portion 14 are supplied by simply inserting the annular solid resin elements 51 and 52 respectively. This method does not need the supply devices 24 and 27 and any pressurizing device or the like for pressurizing the resin materials to be supplied.

A fourth embodiment will be explained below. This embodiment differs from the first embodiment in that the resin molding material 28 is a thermoplastic resin. The following explanation will be given to a method using a conventional injection molding device.

In a conventional resin molding process, thermosetting resin material is used. Thermoplastic resin is generally higher in molding viscosity about 10 to 100 times but lower in fluidity than the thermosetting resin. Accordingly, the use of thermoplastic resin has not been considered at all in the conventional method for molding an entire stator core with resin.

According to the split stator manufacturing method in the present embodiment, on the other hand, the volume of the cavity is reduced to one-tenth or less of the conventional one and therefore the thermoplastic resin can be used. The inventors further studied and devised to use the thermoplastic resin.

Figure 8:
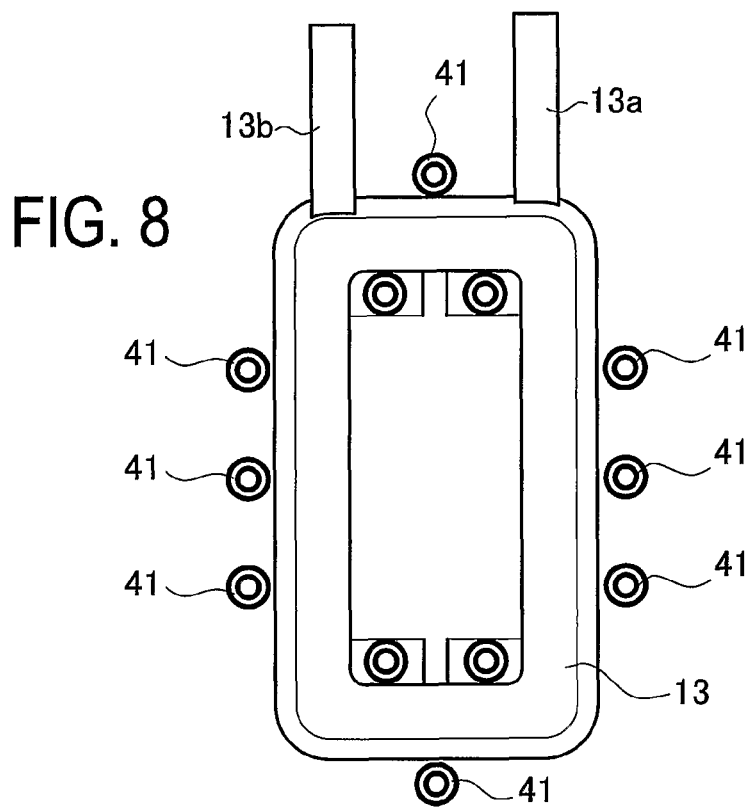
FIG. 8 is a view showing an example using a plurality of gates for supplying resin in a resin molding process.

FIG. 8 shows an example using a plurality of gates for resin injection in the resin molding process, the molding die being not shown. In this example, total twelve gates 41 are arranged, that is, eight gates 41 along an outer periphery of the edgewise coil 13 and four gates 41 at inside corners. Each gate 41 is 2 mm in diameter in this embodiment. This is a basic technique to satisfy both a thin thickness of 0.3 mm or less and a low molding pressure of 30 MPa, which could be difficult in the conventional injection molding. By increasing the number of gates, the flow length of each gate 41 can be shortened, thus reducing flow resistance to lower the inner pressure of a die.

According to the above configuration, it is possible to supply a resin molding material at an in-cavity pressure of 30 MPa or less. Thus, a pressing force required for the die can be reduced, leading to a compact molding device.

The thermoplastic resin to be used in the present embodiment may be selected from PPS, LCP, PBT, PEN, PEEK, fluorocarbon resin, aromatic polyamide resin, etc. In particular, an appropriate one may be selected in consideration of heat resistance, heat conductivity, moldability, crack resistance, and others.

Figure 9:
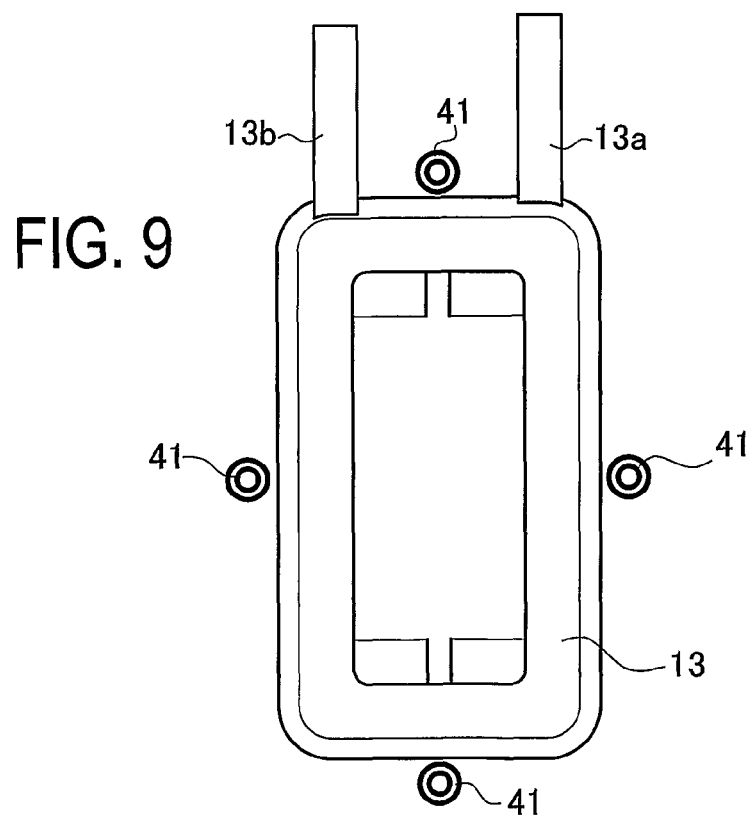
FIG. 9 is a view showing another example using a plurality of gates.

FIG. 9 shows another example using a plurality of gates for resin injection in the resin molding process. In FIG. 9, four gates 41 are arranged along an outer periphery of the edgewise coil 13. This configuration is a technique adopting injection compression molding to satisfy both the thin thickness of a resin molded portion and the low molding pressure in the resin molding. Generally, an injection position is one gate at nearly a center of a product to be molded in order to uniformly minimize the material flow distances in a cavity. However, in molding a split stator core, the shape of a cavity to be supplied with a resin material is within an annular region around the split core. Accordingly, to reliably supply the resin material in four side directions and four vertical directions, the die is configured to have at least one gate in each of the four side directions.

In this example, as compared with FIG. 8, it could be difficult to supply the thermoplastic resin into the cavity. However, if only the upper die is opened to more lower the die inner pressure during resin injection, the thermoplastic resin can be injected through only the four gates. The die is closed at high speed after injection to compress the resin molding material, forming the resin molded portion. As an alternative, the number of gates may be two at two opposite places in the four sides. In this case, the die has only to be opened more widely to ensure material fluidity.

According to the fourth embodiment, the motor stator can be manufactured from the thermoplastic resin, which needs no reaction-curing time in the die, unlike the thermosetting resin, and which allows ultra high cycle molding, thereby achieving high productivity.

The present invention is not limited to the above embodiments and may be embodied in other specific forms without departing from the essential characteristics thereof.

For instance, the above embodiments are explained about the split stator core 10 including a single edgewise coil 13. As an alternative, a split stator core having two teethes 11 may be employed in such a manner that two edgewise coils 13 are mounted on the two teethes 11 respectively and entirely molded or coated with resin. As another alternative, a split stator core having three teethes 11 may be employed in such a manner that three edgewise coils 13 are mounted on the three teethes 11 respectively and entirely molded or coated with resin.

As explained in the above embodiments, the present invention may be applied to any coil made of a coil wire having a circular, square, or different-shaped section as well as the edgewise coil if only it is finished as a formed coil.

In the above embodiments, the upper die base 30 holding the upper die 22 for insulator and the upper die 26 for resin molding is configured to move close to or away from the rotatable platen 37 holding the lower dies 21. Alternatively, it may be arranged such that the upper die base 30 is rotatable and the platen 37 is movable close to or away from the upper die base 30.

While the presently preferred embodiment of the present invention has been shown and described, it is to be understood that this disclosure is for the purpose of illustration and that various changes and modifications may be made without departing from the scope of the invention as set forth in the appended claims.

The invention claimed is:

1. A split stator segment manufacturing method comprising the steps of:
    setting a split core segment in a lower die of a molding die including a first upper die and a second upper die, which are selectively used, and the lower die;
    forming an insulator on the split core segment on a teeth side by resin molding using the first upper die;
    changing the first upper die to the second upper die;
    mounting a formed coil wound in a predetermined shape onto the teeth of the split core segment, and
    molding the formed coil with resin by the second upper die and the lower die.

2. The split stator segment manufacturing method according to claim 1,
    wherein the method comprises:
    supplying resin in the lower die so as to surround the teeth of the split core segment before closing the first upper die and the lower die, and then closing and clamping the first upper die and the lower die to form the insulator from the resin;
    opening the first upper die and the lower die;
    changing the first upper die to the second upper die;
    mounting the formed coil onto the teeth of the split core segment and supplying resin in the lower die before closing the second upper die and the lower die;
    closing and clamping the second upper die and the lower die to mold the formed coil with the resin.

3. The split stator manufacturing method according to claim 1,
    wherein the method further comprises:
    inserting a first solid resin element formed in annular shape in the lower die to surround the teeth of the split core segment set in the lower die, before closing the first upper die and the lower die;
    closing and clamping the first upper die and the lower die to heat and compress the first resin element to form the insulator;
    opening the first upper die and the lower die;
    changing the first upper die to the second upper die;
    mounting the formed coil while compressing the coil onto the teeth of the split core segment and inserting a second solid resin element formed in annular shape in the lower die before closing the second upper die and the lower die;

closing and clamping the second upper die and the lower die to heat and compress the second resin element to mold the formed coil with resin.

4. The split stator manufacturing method according to claim 1, wherein the method comprises:

placing the first upper die and the second upper die on the same fixed base and placing a pair of lower dies on a movable platen;

simultaneously forming the insulator and molding the winding portion with respect to different split core segments respectively by closing and clamping the molding die once; and interchanging positions of the pair of lower dies by rotation of the rotatable platen to newly form the insulator and mold the winding portion with resin with respect to different split core segments respectively at the same time.

* * * * *